United States Patent
Zittel et al.

[15] 3,691,084
[45] Sept. 12, 1972

[54] BASE-BORATE REACTOR SAFETY SPRAY SOLUTION FOR RADIOLYTIC HYDROGEN SUPPRESSION

[72] Inventors: Herman E. Zittel, Kingston; Sebastian B. Lupica, Oak Ridge; Lamont C. Bate, Clinton, all of Tenn.

[73] Assignee: The United States of America as represented by the United States Atomic Energy Commission

[22] Filed: April 19, 1971

[21] Appl. No.: 135,393

[52] U.S. Cl..................252/182, 23/2 R, 23/309, 176/38, 176/92 R, 252/188
[51] Int. Cl.....................B01d 47/06, G21c 15/18
[58] Field of Search.......252/182, 188; 176/38, 92 R; 23/2, 210, 309

[56] References Cited

UNITED STATES PATENTS

| | | |
|---|---|---|
| 3,018,159 | 1/1962 | Silverman....................23/2 R |
| 3,338,665 | 8/1967 | Silverman....................23/2 R |
| 3,630,942 | 12/1971 | Soldano....................252/188 |

*Primary Examiner*—Leon D. Rosdol
*Assistant Examiner*—Irwin Gluck
*Attorney*—Roland A. Anderson

[57] ABSTRACT

As a new composition of matter, water or an aqueous solution of sodium hydroxide containing up to 3,000 ppm boron as the borate is provided, said water or solution having a pH in the range 5.8 to 12.1, said water or solution containing a reagent selected from the group consisting essentially of $Na_2MoO_4$, $Na_2CrO_4$, $Na_2WO_4$, and $NaVO_3$ at a concentration which is effective to suppress hydrogen formation resulting from irradiation of said solution in a nuclear reactor.

2 Claims, No Drawings

BASE-BORATE REACTOR SAFETY SPRAY SOLUTION FOR RADIOLYTIC HYDROGEN SUPPRESSION

BACKGROUND OF THE INVENTION

The invention described herein was made in the course of, or under, a contract with the U. S. Atomic Energy Commission.

The present invention relates to an improved reactor safety spray solution. More particularly, it relates to reactor safety spray solutions having an enhanced capacity to suppress the formation of hydrogen produced by exposure of aqueous solutions to the effects of heat and nuclear radiation.

Nuclear plant designs for boiling-water and pressurized-water reactors provide for aqueous sprays or solutions for pressure suppression in the event of a loss-of-coolant accident and for concomitant reduction of airborne radioactivity in the reactor containment. It has been determined that these aqueous sprays or solutions would be exposed to as much as $3 \times 10^8$ rads of ionizing radiation at temperatures from ambient up to as much as 150° C. during the course of a loss-of-coolant accident. In static and dynamic radiolytic studies involving exposure of water and base-borate solutions, it has been found that considerable quantities of hydrogen and oxygen are generated to a point where they may pose a safety hazard arising from detonation of an explosive mixture of radiolytically generated hydrogen and oxygen.

It is therefore an object of the present invention to provide a method and composition for suppressing the generation of radiolytic hydrogen generated by exposure of water and base-borated solutions comprising a 0–0.2 M solution of an alkali metal hydroxide containing from 0 to 3,000 ppm boron, said solution having a pH in the range 4 to 10.

SUMMARY AND DESCRIPTION OF THE INVENTION

This and other objects of the invention can be satisfied by providing a class of additives to water or a base-borate solution of the type described above. The class of additives is selected from the group consisting of sodium molybdate, $Na_2MoO_4$; sodium chromate, $Na_2CrO_4$; sodium tungstate $Na_2WO_4$; and sodium vanadate, $NaVO_3$. Of these, sodium vanadate is preferred as the most effective at a given additive concentration. The hydrogen suppression action of these additives is effective over a wide range of concentration from $10^{-6}$ to $2 \times 10^{-3}$ M. The invention is described in the following examples.

EXAMPLE I

The effectiveness of the class of designated reagents in suppressing the formation of hydrogen generated by radiolysis of a base-borate solution is summarized in Table I below.

TABLE I

Effect of Various Salts on $G(H_2)$ in Spray Solutions

Test solution: 0.15 N NaOH with 3000 ppm B plus added salt
Total dose: $7 \times 10^7$ rad
Gal/liquid ratio: 1
Cover gas: air
Temperature: ambient

| Compound | Additive Concentration (M) | Radiolytic $H_2$ (vol %)[b] | $G(H_2)$[c] |
|---|---|---|---|
| Blank 1[a] | | 34 | 0.43 |
| Blank 2[a] | | 37 | 0.46 |
| $Na_2MoO_4$ | $2 \times 10^{-3}$ | 18 | 0.22 |
| | $2 \times 10^{-4}$ | 28 | 0.35 |
| | $2 \times 10^{-5}$ | 34 | 0.42 |
| | $2 \times 10^{-6}$ | 35 | 0.44 |
| $Na_2CrO_4$ | $2 \times 10^{-3}$ | 14 | 0.17 |
| | $2 \times 10^{-4}$ | 23 | 0.29 |
| | $2 \times 10^{-5}$ | 33 | 0.41 |
| | $2 \times 10^{-6}$ | 37 | 0.46 |
| $Na_2WO_4$ | $2 \times 10^{-3}$ | 24 | 0.30 |
| | $2 \times 10^{-4}$ | 32 | 0.40 |
| | $2 \times 10^{-5}$ | 33 | 0.41 |
| | $2 \times 10^{-6}$ | 34 | 0.42 |
| $NaVO_3$ | $2 \times 10^{-2}$ | | 0.04 |
| | $2 \times 10^{-3}$ | 4 | 0.05 |
| | $2 \times 10^{-4}$ | 10 | 0.12 |
| | $2 \times 10^{-5}$ | 26 | 0.32 |
| | $2 \times 10^{-6}$ | 27 | 0.34 |

[a] No salt added.
[b] Percent of gas phase, measured by volume.
[c] $G(H_2)$ = no. of moles of $H_2$ generated/dose, generally in terms of millimoles $H_2$/ml of solution/rad of absorbed radiation.

It is seen that all of the reagents were effective in suppressing hydrogen formation at the higher range of reagent concentration tested. Of the four reagents tested, sodium vanadate was the most effective at all concentrations. A concentration of $2 \times 10^{-3}$ M $NaVO_3$ in the base-borate solution resulted in a reduction of from 88 to 90 percent relative to the control or blank (without hydrogen suppressant reagent). Concentrations beyond $2 \times 10^{-3}$ M do not provide any additional practical increment of hydrogen suppression.

EXAMPLE II

In another study, the effect of radiation dose on the hydrogen suppression action of the most effective reagent was determined over a dose in the range $2.6 \times 10^7$ to $4.5 \times 10^8$ rads at constant $NaVO_3$ concentration. The results are summarized in Table II below.

TABLE II

Dose Versus $G(H_2)$ in $NaOH$-$H_3BO_3$-$NaVO_3$ Solution

Test solution: 0.15 N NaOH-3000 ppm B added as $H_3BO_3$ plus $2 \times 10^{-3}$ M $NaVO_3$
Dose rate: $4 \times 10^6$ r/hr
Gas/liquid ratio: ≈1
Cover gas: air
Test method: capsule

| Total Dose (rads) | Radiolytic Gas Gage Pressure (atm) | $G(H_2)$ |
|---|---|---|
| $2.6 \times 10^7$ | 0.07 | $0.04_4$ |
| $7.3 \times 10^7$ | 0.12 | $0.04_5$ |
| $1.0 \times 10^8$ | 0.20 | $0.05_5$ |
| $1.8 \times 10^8$ | 0.32 | $0.05_8$ |
| $3.6 \times 10^8$ | 1.74 | $0.14_4$ |
| $4.5 \times 10^8$ | 2.86 | $0.18_6$ |

The data show that the $NaVO_3$ limits the radiolytic hydrogen production to a fairly constant level up to a dose of about $2 \times 10^8$ rads, after which the $G(H_2)$ value rises, indicating a relatively slight diminution in hydrogen suppression.

EXAMPLE III

This example demonstrates the effectiveness of $NaVO_n$ in reducing the amount of hydrogen generated in distilled water. The test conditions as well as test results obtained at two temperatures are summarized in Table III below.

TABLE III

Effect of $NaVO_3$ on Radiolytic $H_2$ in Distilled $H_2O$

Test solutions: (A) distilled $H_2O$
(B) distilled $H_2O$ plus $2 \times 10^{-3}$ M $NaVO_3$
Gas/liquid ratio$^a$: 0.5
Cover gas: air
Total dose: $5 \times 10^8$ rad
Test mode: circulating radiation loop
Pumping speed: such that average residence time in radiation capsule between 1 and 2 mins.

| Test Solution | Temperature, °C. | $H_2$, vol. %$^b$ |
|---|---|---|
| A | 65 | 32 |
| B | 65 | 3.7 |
| A | 95 | 23 |
| B | 95 | 2.6 |

$^a$ Ratio of volume of cover gas (air) to volume of liquid in test containment.
$^b$ Established by gas chromatograph after system reached steady state as evidenced by constant pressure.

The results show clearly that radiolytic hydrogen is suppressed in a circulating loop of distilled water by the use of an effective concentration of $NaVO_3$.

EXAMPLE IV

In order to test the stability of response of the $NAAVO_3$ hydrogen suppression action as a function of pH of test solutions, base-borate test solutions containing $2 \times 10^{-3}$ M $NaVO_3$ a wide range of pH were irradiated and tested for the amount of radiolytic hydrogen produced. pH was adjusted by addition of 1 M NaOH to $2 \times 10^{-3}$ M $NaVO_3$-3,000 ppm boron solution. The results are summarized in Table IV below.

TABLE IV

Effect of pH on $NaVO_3$ $G(H_2)$ Reduction

Test solution: $2 \times 10^{-3}$ M $NaVO_3$
3000 ppm B
NaOH (used as needed to reach the desired pH)
Test mode: static capsule
Total dose: $1 \times 10^8$ rad
Dose rate: $4 \times 10^6$ r/hr
Temperature: ambient

| pH | $G(H_2)$* |
|---|---|
| 5.8 | 0.12 |
| 6.5 | 0.08 |
| 7.0 | 0.05 |
| 7.5 | 0.03 |
| 8.0 | 0.03 |
| 8.5 | 0.04 |
| 9.0 | 0.03 |
| 9.5 | 0.04 |
| 10.9 | 0.22 |
| 12.1 | 0.27 |

*All $G(H_2)$ values are averages of three runs.

The test results show clearly that the hydrogen suppression is substantially stable over the pH range 6.5–9.5 and is still significantly effective over a wide range from 5.8 to 12.1.

EXAMPLE V

The effect of temperature on the hydrogen suppression effect of $NaVO_3$ for dynamic test conditions measured at temperatures in the range 35°–125° C. is summarized in Table V below.

TABLE V

Effect of $NaVO_3$ on Radiolytic $H_2$

Test solutions: (A) 0.15 N NaOH-3000 ppm B
(B) 0.15 NaOH-3000 ppm B plus $2 \times 10^{-3}$ M $NaVO_3$
Cover gas: air
Total dose: $\approx 2 \times 10^8$ rad
Test mode: radiation loop

| Test Solution | Temperature, °C. | $G(H_2)$ |
|---|---|---|
| A | 35 | 0.41 |
| B | 35 | 0.03 |
| A | 65 | 0.36 |
| B | 65 | 0.04 |
| A | 95 | 0.35 |
| B | 95 | 0.04 |
| A | 125 | 0.30 |
| | 125 | 0.02 |

The results of the same test conducted at ten times the dose used in compiling the date of Table V are shown in Table VI below.

TABLE VI

Effect of $NaVO_3$ on Radiolytic $H_2$

Test solutions: (A) 3000 ppm B
(B) 3000 ppm B plus $2 \times 10^{-3}$ M $NaVO_3$
Cover gas: air
Total dose: $\approx 3 \times 10^8$ rad
Test mode: radiation loop

| Test Solution | Temperature, °C. | $G(H_2)$ |
|---|---|---|
| A | 65 | 36 |
| B | 65 | 3.2 |
| A | 95 | 28 |
| B | 95 | 2.5 |

The data of Tables V and VI show clearly the effectiveness of $NaVO_3$ in suppressing radiolytic hydrogen at elevated temperatures and at high radiation dosage.

In summary, we have described an invention supported by experimental test data which show the effectiveness of a class of reagents which function to suppress the formation of radiolytic hydrogen of irradiated aqueous base-borate solutions or water. Of the class of reagents, $NaVO_3$ has been shown to be the most effective on a weight basis and effective at elevated temperatures as well as over a wide range of dosage and pH. All irradiation were conducted by exposing the test solutions to a 60,000-curie $Co^{60}$ gamma source.

It will be evident by those skilled in the art that the hydrogen suppression data obtained by irradiating the test solutions with $Co^{60}$ gamma provides a sound basis for illustrating the utility of these reagents in suppressing hydrogen in solutions exposed to the radiation of a going nuclear reactor or other radiation which generates sufficient hydrogen to warrant utilizing the hydrogen suppressant action of the defined class of reagents.

What is claimed is:

1. As a new composition of matter, water or an aqueous solution of sodium hydroxide containing up to 3,000 ppm boron as the borate, said water or solution having a pH in the range 5.8 to 12.1, said water or solution containing a reagent selected from the group consisting of $Na_2MoO_4$, $Na_2CrO_4$, $Na_2WO_4$, and $NaVO_3$ at a concentration of $10^{-6}$ to $2 \times 10^{-3}$ M which is effective to suppress hydrogen formation resulting from irradiation of said solution in a nuclear reactor.

2. As a new composition of matter, water or an aqueous solution of sodium hydroxide containing up to 3,000 ppm boron as the borate, said water or solution having a pH in the range 5.8 to 12.1, said water or solution containing sodium vanadate, $NaVO_3$, at a concentration of $10^{-6}$ to $2 \times 10^{-3}$ M which is effective to suppress hydrogen formation resulting from irradiation of said solution by exposure of said water or solution to a radiation dose sufficient to produce hydrogen such as in a nuclear reactor.

* * * * *